J. H. SMITT.
Draw-Bar Attachment for Railway-Cars.
No. 208,994. Patented Oct. 15, 1878.
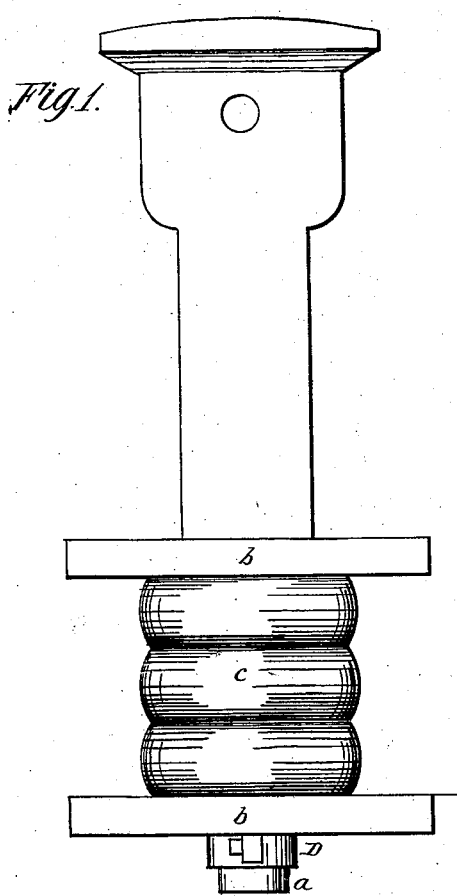
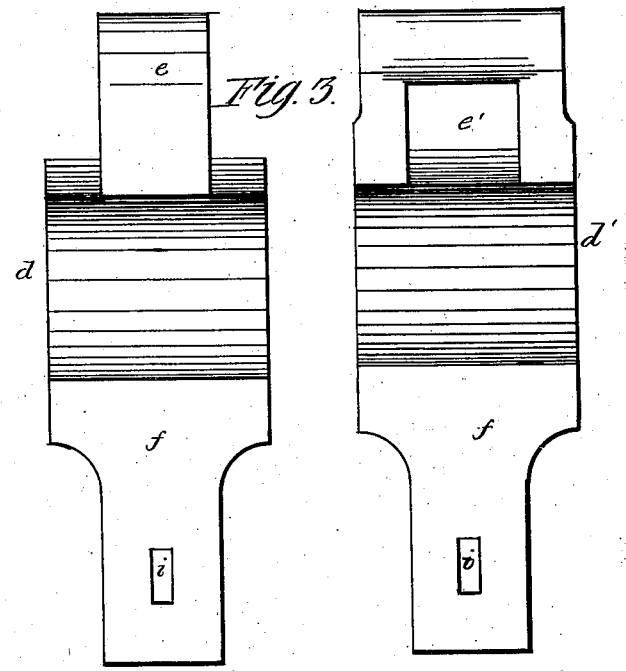
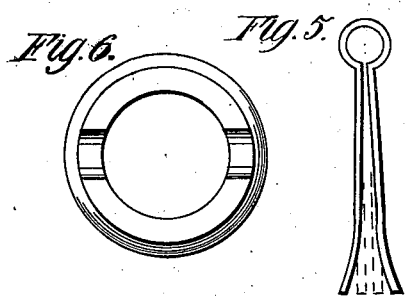
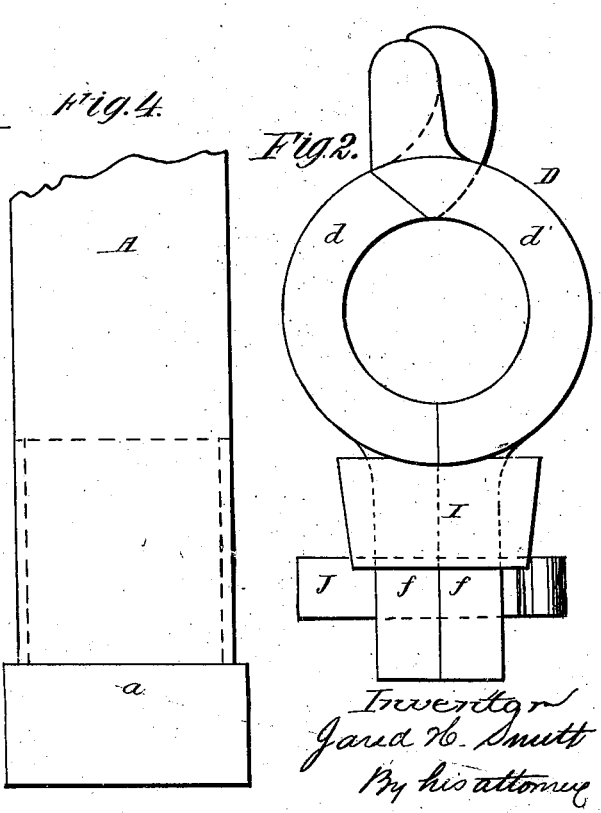

UNITED STATES PATENT OFFICE.

JARED H. SMITT, OF NORWICH, CONNECTICUT.

IMPROVEMENT IN DRAW-BAR ATTACHMENTS FOR RAILWAY-CARS.

Specification forming part of Letters Patent No. 208,994, dated October 15, 1878; application filed April 3, 1878.

*To all whom it may concern:*

Be it known that I, JARED H. SMITT, of Norwich, New London county, Connecticut, have invented an Improved Draw-Bar Attachment, of which the following is a specification:

My invention is an improved attachment for draw-bars, constructed as fully described hereinafter, so as to secure a cheap, strong, and durable attachment of the bar to the car, and yet facilitate its removal.

In the drawings which form part of this specification, Figure 1 is a draw-head with my improvement; Fig. 2, a view showing the attachment; Fig. 3, views showing parts of the attachment; Fig. 4, the end of the draw-bar adapted to my improvement; Fig. 5, a detached view of the key; and Fig. 6, a detached view showing the ring.

Draw-bars are usually provided at their rear ends with keys or nuts, which, bearing against a cross-beam, bar, follower, plate, or other object, prevent the bar from being drawn forward, and sustain the entire draft of the car. The cross-pins, being of comparatively small size, are apt to upset or break under severe strains, or to become loose or fly out of place from jarring. The nuts are likewise apt to become loose from the same cause, while both the pin and nut, when once fixed or set in place, are very difficult to remove, the removal of the nut being impossible when the end of the draw-bar is jammed back against a beam or becomes battered, as is frequently the case.

To avoid these difficulties, I form upon the end of the draw-bar A an enlargement, *a*, which can be passed through the openings in the follower-plates *b* or in the beam, and through the spring of rubber or other material *c*. Between the enlargement and the follower or beam *b*, I apply a divided clamp or sleeve, D, constructed in any suitable manner, that shown consisting of two sections, *d d'*, hinged or locked together.

The draft upon the bar is resisted by the enlargement *a* bearing on the clamp D, which will not break under anything less than a crushing strain, while its instant removal, even with the end of a draw-bar battered or against a beam, may be effected by simply separating the divisions or sections.

Various ways of connecting the two sections of the clamp may be adapted, that shown in the drawing consisting in providing the section *d* with a tongue, *e*, locking through an opening, *e'*, of the section *d'*, and applying a ring, I, to clasp the tongues *f f* of both sections, as shown in Fig. 2, a key, J, passing through slots *i* of the tongues and holding the ring in place.

If desired, the bar may be slightly reduced, as shown in dotted lines, Fig. 4, to produce a shoulder to receive the clamp.

I claim—

1. The combination of the follower-plate or beam *b*, a bar, A, extending through the same, and having an enlargement, *a*, at the end, and a divided sleeve or clamp, D, applied to the bar between the enlargement and the beam, as and for the purpose set forth.

2. A draw-bar provided with an enlargement at the end, and with a detachable clamp secured between the enlargement and the plate or beam *b*, as set forth.

3. The attachment consisting of sections *d d'*, provided with slotted tongues *f f*, the ring I, and key J, as specified.

In testimony whereof I have signed my name to this specification in the presence of two subscribing witnesses.

JARED H. SMITT.

Witnesses:
N. C. CHAPELL,
FRANK E. FOWLER.